Figures 1, 2:
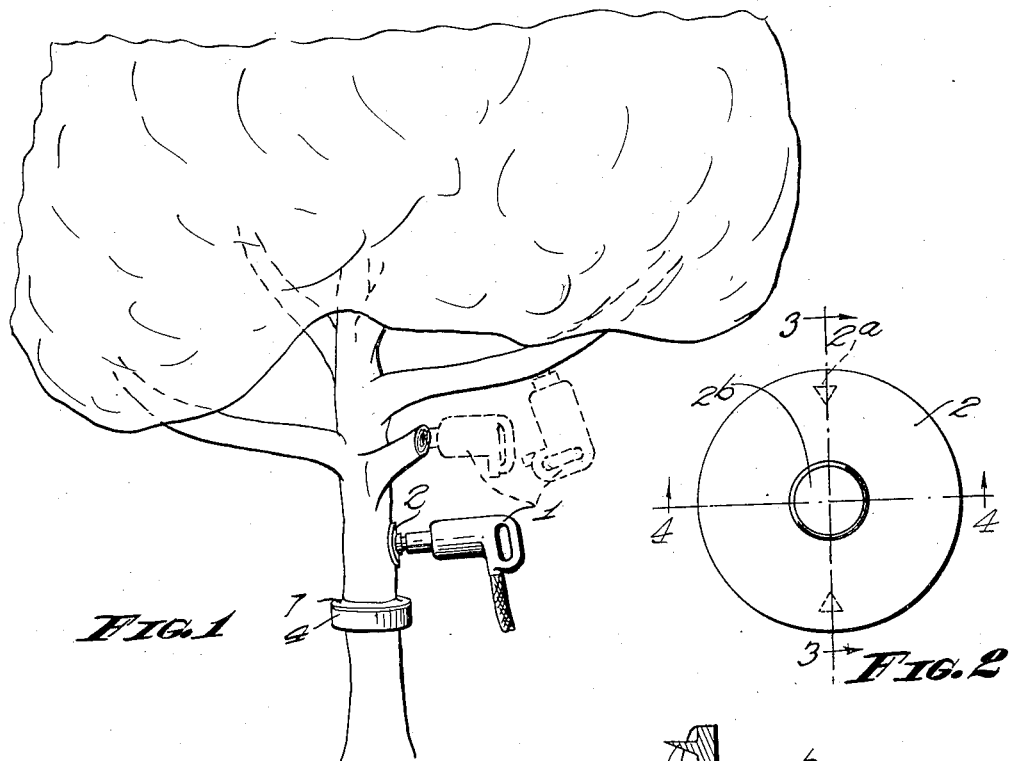

Feb. 11, 1936.  E. BERNITZ, SR  2,030,052
APPARATUS FOR RIDDING TREES OF INSECTS
Filed Sept. 23, 1933

Inventor
ERNEST BERNITZ SR.
By A. B. Bowman
Attorney

Patented Feb. 11, 1936

2,030,052

UNITED STATES PATENT OFFICE 2,030,052

APPARATUS FOR RIDDING TREES OF INSECTS

Ernest Bernitz, Sr., La Mesa, Calif., assignor of one-half to William A. Smith, Vista, Calif.

Application September 23, 1933, Serial No. 690,689

8 Claims. (Cl. 47—24)

My invention relates to an apparatus for ridding trees of insects, and the objects of my invention are:

First, to provide an apparatus of this class which loosens and removes the insects and other parasites in the tree, and prevents their returning to the tree once they have fallen to the ground;

Second, to provide an apparatus of this class wherein a vibratory action is produced on the tree to loosen the grip of the insects, thereby permitting the use of water under pressure to wash the insects off the tree;

Third, to provide an apparatus of this class which eliminates the need of poisonous materials and the attendant danger to the workman as well as the detrimental effect to the tree resulting from the poisonous material;

Fourth, to provide an apparatus of this class in which the tree is actually invigorated, its return sap flow stimulated so that immediately upon treatment and removal of the insects, the tree begins to respond;

Fifth, to provide a means of this class which is inexpensive to use and requires inexpensive and simple apparatus;

Sixth, to provide an apparatus for ridding trees of insects which includes an element in the nature of a barrier applied around the trunk of a tree, the barrier being such as to expand with the growth of the tree, and to provide both a mechanical labyrinth obstruction as well as a chemical retardant, the retardant being in spaced relation to the tree trunk so that the tree trunk is protected;

Seventh, to provide a barrier for tree trunks having a surface over which insects whether minute or relatively large avoid traversing the exposed surface as well as the surface in contact with the tree trunk forming virtually a labyrinth which confuses or entangles the insect, and includes on the exposed surfaces straggling wisps or hair like extensions which afford insecure footing causing the insects quickly to lose their hold; and Eighth, to provide a barrier of this class which incorporates a sheltered portion upon which an insect deterrent may be sprayed or otherwise applied, said portion being insulated from the tree trunk and protected from the weather so that the insect deterrent may function for a relatively long period of time.

Figure 3:
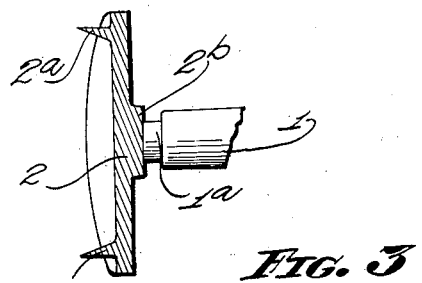
Figures 4, 5:
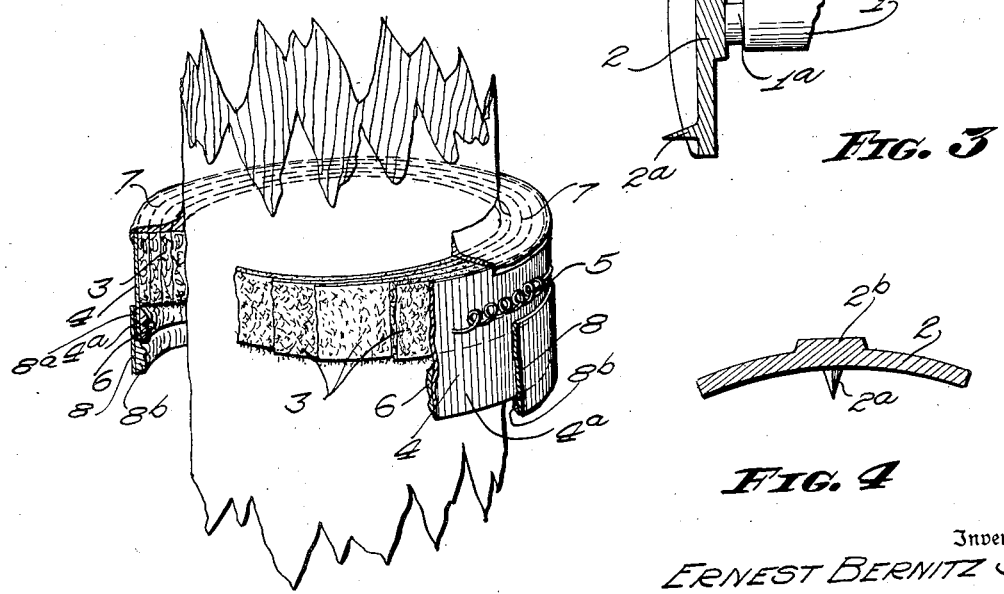

With these and other objects in view as will appear hereinafter, my invention consists of certain novel features of construction, combination, and arrangement of parts and portions as will be hereinafter described in detail and particularly set forth in the appended claims, reference being had to the acompanying drawing and to the characters of reference thereon which form a part of this application, in which:

Figure 1 is a diagrammatical view of a tree illustrating the manner in which the barrier is applied and the pneumatic hammer is utilized; Fig. 2 is a plan view of the striking plate; Fig. 3 is a sectional view thereof through 3—3 of Fig. 2; Fig. 4 is another sectional view thereof through 4—4 of Fig. 2; and Fig. 5 is a fragmentary partially broken away perspective view of the barrier.

Pneumatic hammer 1, striking plate 2, labyrinth band 3, sheltering band 4, tie means 5, insect deterrent 6, water proof coating 7 and deterrent band 8 constitute the principal parts and portions of my apparatus for protecting trees from insects.

As an initial step in the treatment of a tree or as a final step if used immediately after treating a tree, I apply an insect barrier around the trunk of the tree.

I have found that hair felt has several features that make it uniquely suitable for the protection of trees from insects. In the first place this material is very durable and will not rot when exposed to the weather; secondly, the material is under ordinary circumstances impervious to water, it being necessary to work or scrub the water into the hair felt before it is absorbed so that the water tends to flow around the surface of the hair felt without penetrating; third, the surface of hair felt forms virtually a labyrinth over which it is impossible for an insect to pass. Ends of the hairs, some of which are quite fine, project outwardly from the normal surface of the hair felt. The insect after attempting to force its way through or along the surface of the felt, climbs the various protruding hairs and its foothold becomes precarious. After a few such attempts, the insect is sure to fall particularly when crawling along the under side of the hair felt. The hair felt which is used to form the labyrinth band, designated 3, is relatively coarse and is of sufficient length to be wrapped around the trunk of the tree several times. Its ends are beveled so that no spaces are formed between the felt and the tree. Around the outside of the labyrinth band 3 is applied a sheltering band 4. The sheltering band 4 is preferably formed of tar paper or the like and is somewhat wider than the labyrinth band so that the lower margin of the sheltering band protrudes below, as indicated by 4a. The bands are held in place by a suitable tie means 5 which may be formed of wire with a coiled portion therein to permit expansion.

The inner side of the over-hanging portion 4a of the sheltering band 4 is coated with an insect deterrent 6. It will be noted that the sheltering band 4 is spaced a considerable distance from the tree by means of the labyrinth band 3; thus, the insect must crawl along the under side of the labyrinth band 3, and in most cases, will fall before reaching the insect deterrent, but the few insects that reach the deterrent are positively stopped thereby. The upper edges of the labyrinth band and sheltering band are coated with a suitable waterproof material 7, such as asphaltum. The waterproof material may extend upwardly around the trunk a short distance.

After the barrier has been positioned, the tree is vibrated by placing the end of the pneumatic hammer 1 against the various main limbs and against the trunk of the tree, and particularly against the ends of any limbs which may have been severed. This rapid vibratory effect causes the insects and even the scale to loosen their hold. To facilitate the action of the hammer there may be provided a striking plate 2, preferably cast of metal, of circular form, and preferably slightly curved to approximately conform to the curvature of the trunk.

The striking plate is provided with a pair of prongs 2a shaped to wedge into the tree when the striking plate is engaged by the handle. The central portion of the striking plate is provided with a pad 2b against which the hammer 1a of the pneumatic hammer engages, as shown in Figs. 1 and 2. The striking plate prevents the hammer, because of its relatively small area, from bruising the tree, and also distributes the more efficiently the impact force of the hammer.

Immediately after the tree has been thoroughly vibrated, a large quantity of water under relatively high pressure is applied to the tree. It is intended to do more than spray the tree; that is, the water should engage the leaves and branches with sufficient force to wash off the insects whose grip has been loosened by the vibrating action of the pneumatic hammer.

With reference again to the barrier, additional bands 8 may be provided. These bands are applied around the sheltering band 4 so as to overhang the lower edge. The additional deterrent bands 8 may be provided with adhesive 8a at its portion of its inner side to facilitate attachment to the sheltering band and its lower inner side is provided with a coating 8b of insect deterrent. Thus, additional bands may be applied from time to time as the insect deterrent 6 becomes ineffective.

In summation, the operation of my apparatus is as follows: A barrier is applied around the trunk of the tree; the tree is then vibrated rapidly by the application of a pneumatic hammer upon the trunk and various limbs; then the large volume of water with considerable force is directed against the branches, leaves, and fruit to wash off the insects that have been loosened.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. A barrier for protecting trees from crawling insects consisting of a wrapping having a substantially flat but irregular and yieldable surface in the form of a tangled mass adapted to be applied directly about the trunk of the tree and conform to the irregularities thereof so as to confront insects with a labyrinth barrier, said wrapping also including an extended parallel labyrinth surfaced flanging portion at its underside, and a protecting skirt applied around the wrapping.

2. A barrier for protecting trees from crawling insects consisting of a wrapping having a substantially flat but irregular and yieldable surface in the form of a tangled mass adapted to be applied directly about the trunk of the tree and conform to the irregularities thereof so as to confront insects with a labyrinth barrier, said wrapping also including an extended parallel labyrinth surfaced flanging portion at its underside, and a protecting skirt applied around the wrapping, said skirt protruding below the wrapping in parallel spaced relation with the tree trunk, and an insect deterrent applied to the inner and protected side of the skirt.

3. A barrier for protecting trees from crawling insects consisting of a wrapping having a substantially flat but irregular and yieldable surface in the form of a tangled mass adapted to be applied directly about the trunk of the tree and conform to the irregularities thereof so as to confront insects with a labyrinth barrier, said wrapping also including an extended parallel labyrinth surfaced flanging portion at its underside, and a protecting skirt applied around the wrapping, said skirt protruding below the wrapping in spaced parallel relation with the tree trunk, and an insect deterrent applied to the inner and protected side of the skirt, and an impervious roof means extending from the tree trunk over the wrapping and skirt.

4. A barrier for protecting trees from crawling insects including, a wrapping consisting of a multiple of superposed layers of hair felt forming a yieldable surface in the form of a tangled mass applied directly about the trunk of the tree, and a sheltering band of greater width surrounding said superposed layers of hair felt parallel therewith and extending below the same.

5. A barrier for protecting trees from crawling insects including, a wrapping consisting of a multiple of superposed layers of hair felt forming a yieldable surface in the form of a tangled mass applied directly about the trunk of the tree, a sheltering band of greater width surrounding said superposed layers of hair felt parallel therewith and extending below the same, and an insect deterrent coating on the inner surface of said sheltering band below said superposed layers.

6. A barrier for protecting trees from crawling insects including, a wrapping consisting of a multiple of superposed layers of hair felt forming a yieldable surface in the form of a tangled mass applied directly about the trunk of the tree, a sheltering band of greater width surrounding said superposed layers of hair felt parallel therewith and extending below the same, an insect deterrent coating on the inner surface of said sheltering band below said superposed layers, and a deterrent band of less width than said sheltering band mounted around the lower side of said sheltering band and extending below the same and provided with an insect deterrent on its inner surface below the lower edge of said sheltering band.

7. A barrier for protecting trees from crawling insects including, a wrapping consisting of a multiple of superposed layers of hair felt forming a yieldable surface in the form of a tangled mass applied directly about the trunk of the tree, a sheltering band of greater width surrounding said superposed layers of hair felt parallel therewith and extending below the same, an insect deterrent coating on the inner surface of said sheltering band below said superposed layers, a deterrent band of less width than said sheltering band mounted around the lower side of said sheltering band and extending below the same and provided with in insect deterrent on its inner surface below the lower edge of said sheltering band, and a yieldable tie means around said sheltering band above said deterrent band for yieldably supporting said superposed layers and sheltering band around the tree trunk.

8. A barrier for protecting trees from crawling insects including, a wrapping consisting of a multiple of superposed layers of hair felt forming a yieldable surface in the form of a tangled mass applied directly about the trunk of the tree, a sheltering band of greater width surrounding said superposed layers of hair felt parallel therewith and extending below the same, an insect deterrent coating on the inner surface of said sheltering band below said superposed layers, a deterrent band of less width than said sheltering band mounted around the lower side of said sheltering band and extending below the same and provided with an insect deterrent on its inner surface below the lower edge of said sheltering band, a yieldable tie means around said sheltering band above said deterrent band for yieldably supporting said superposed layers and sheltering band around the tree trunk, and a waterproof covering positioned over the upper edges of said superposed layers and said sheltering band and against the tree trunk.

ERNEST BERNITZ, Sr.